United States Patent
Smyth

(10) Patent No.: US 9,171,401 B2
(45) Date of Patent: Oct. 27, 2015

(54) CONSERVATIVE PARTITIONING FOR RENDERING A COMPUTER-GENERATED ANIMATION

(71) Applicant: DreamWorks Animation LLC, Glendale, CA (US)

(72) Inventor: Evan P. Smyth, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 278 days.

(21) Appl. No.: 13/831,309

(22) Filed: Mar. 14, 2013

(65) Prior Publication Data

US 2014/0267288 A1    Sep. 18, 2014

(51) Int. Cl.
*G06T 17/00* (2006.01)

(52) U.S. Cl.
CPC .................................... *G06T 17/005* (2013.01)

(58) Field of Classification Search
None
See application file for complete search history.

(56) References Cited

U.S. PATENT DOCUMENTS

| | | | |
|---|---|---|---|
| 5,329,360 A | 7/1994 | Gillard et al. |
| 5,675,752 A | 10/1997 | Scott et al. |
| 5,808,617 A | 9/1998 | Kenworthy et al. |
| 5,808,625 A | 9/1998 | Picott et al. |
| 5,896,139 A | 4/1999 | Strauss |
| 5,982,389 A | 11/1999 | Guenter et al. |
| 5,986,667 A | 11/1999 | Jevans |
| 6,154,215 A | 11/2000 | Hopcroft et al. |
| 6,243,856 B1 | 6/2001 | Meyer et al. |
| 6,252,608 B1 | 6/2001 | Snyder et al. |
| 6,263,103 B1 | 7/2001 | Freeman et al. |
| 6,272,650 B1 | 8/2001 | Meyer et al. |
| 6,496,190 B1 | 12/2002 | Driemeyer et al. |
| 6,556,200 B1 | 4/2003 | Pfister et al. |
| 6,611,262 B1 | 8/2003 | Suzuki |
| 6,760,485 B1 | 7/2004 | Gilman et al. |
| 6,919,891 B2 | 7/2005 | Schneider et al. |

(Continued)

FOREIGN PATENT DOCUMENTS

| | | |
|---|---|---|
| EP | 1918880 A2 | 5/2008 |
| EP | 1918881 A2 | 5/2008 |

(Continued)

OTHER PUBLICATIONS

"Intro to Animation", Power Point Presentation, available online at <http://visservices.sdsc.edu/courses/maya/spring06/introtoanim.ppt>, accessed on Apr. 30, 2013, 32 pages.

(Continued)

*Primary Examiner* — Maurice L McDowell, Jr.
(74) *Attorney, Agent, or Firm* — Morrison & Foerster LLP

(57) ABSTRACT

A system for partitioning a set of assets, where each asset represents a computer-generated object associated with a computer-generated scene. A dependency graph comprising a plurality of interconnected nodes including an organizer node is accessed. The set of assets identified by an input of a predicate test of the organizer node are accessed. It is determined if the at least one predicate test can be evaluated using the set of assets. If the at least one predicate test can be evaluated, one or more partition assets are identified and passed to a next node. If the at least one predicate test cannot be evaluated, a conservative set of assets is identified and passed to the next node, wherein the conservative set of assets is the same set of assets identified by the input of the predicate test.

20 Claims, 8 Drawing Sheets

(56) References Cited

U.S. PATENT DOCUMENTS

| | | |
|---|---|---|
| 7,174,039 B2 | 2/2007 | Koo et al. |
| 7,414,626 B1 | 8/2008 | Picott |
| 7,439,982 B2 | 10/2008 | Deniau et al. |
| 7,548,238 B2 | 6/2009 | Berteig et al. |
| 7,911,472 B2 | 3/2011 | Harper |
| 7,920,143 B1 | 4/2011 | Haratsch et al. |
| 8,009,176 B2 | 8/2011 | Zimmer |
| 8,259,110 B1 | 9/2012 | Carr et al. |
| 8,274,506 B1 | 9/2012 | Rees |
| 8,339,402 B2 | 12/2012 | Henson et al. |
| 8,352,397 B2 | 1/2013 | Rubin et al. |
| 8,352,443 B1 | 1/2013 | Polson et al. |
| 8,369,564 B2 | 2/2013 | Hervas et al. |
| 8,612,485 B2 | 12/2013 | Selan et al. |
| 8,624,898 B1 | 1/2014 | Bugaj et al. |
| 8,773,433 B1 | 7/2014 | Smyrl |
| 2001/0027388 A1 | 10/2001 | Beverina et al. |
| 2002/0063704 A1 | 5/2002 | Sowizral et al. |
| 2002/0099684 A1* | 7/2002 | Ardoin et al. ............. 707/1 |
| 2002/0128841 A1 | 9/2002 | Kibre et al. |
| 2002/0140707 A1 | 10/2002 | Samra et al. |
| 2002/0163518 A1 | 11/2002 | Rising, III et al. |
| 2002/0188613 A1 | 12/2002 | Chakraborty et al. |
| 2003/0156117 A1 | 8/2003 | Higuchi et al. |
| 2004/0052450 A1 | 3/2004 | Morrison |
| 2004/0109501 A1 | 6/2004 | Wollborn |
| 2004/0160445 A1 | 8/2004 | Whatmough |
| 2004/0189668 A1 | 9/2004 | Beda et al. |
| 2004/0194020 A1 | 9/2004 | Beda et al. |
| 2004/0222989 A1 | 11/2004 | Zhang et al. |
| 2004/0222992 A1 | 11/2004 | Calkins et al. |
| 2005/0039176 A1 | 2/2005 | Fournie et al. |
| 2005/0110790 A1 | 5/2005 | D'Amora |
| 2005/0140694 A1 | 6/2005 | Subramanian et al. |
| 2005/0256950 A1 | 11/2005 | Suzuki |
| 2005/0262470 A1 | 11/2005 | Gavrilov |
| 2006/0176403 A1 | 8/2006 | Gritton et al. |
| 2007/0080964 A1 | 4/2007 | Kainz et al. |
| 2007/0176926 A1 | 8/2007 | Garcia et al. |
| 2007/0185881 A1 | 8/2007 | Vienneau et al. |
| 2008/0028414 A1 | 1/2008 | Couture-Gagnon et al. |
| 2008/0049033 A1 | 2/2008 | Yang |
| 2008/0117216 A1 | 5/2008 | Dorie |
| 2008/0122838 A1 | 5/2008 | Hoover et al. |
| 2008/0231633 A1 | 9/2008 | Keller et al. |
| 2008/0238916 A1 | 10/2008 | Ghosh et al. |
| 2008/0278482 A1 | 11/2008 | Farmanbar et al. |
| 2009/0021513 A1 | 1/2009 | Joshi et al. |
| 2009/0027380 A1 | 1/2009 | Rajan et al. |
| 2010/0079462 A1 | 4/2010 | Breeds et al. |
| 2010/0123723 A1 | 5/2010 | Collard et al. |
| 2010/0134501 A1 | 6/2010 | Lowe et al. |
| 2010/0177104 A1 | 7/2010 | Dufour et al. |
| 2010/0214284 A1 | 8/2010 | Rieffel et al. |
| 2010/0214313 A1 | 8/2010 | Herman et al. |
| 2010/0289804 A1 | 11/2010 | Jackman et al. |
| 2010/0302249 A1 | 12/2010 | Fowler et al. |
| 2010/0322358 A1 | 12/2010 | Drumm et al. |
| 2011/0090236 A1 | 4/2011 | Calsyn et al. |
| 2011/0106843 A1 | 5/2011 | Pan et al. |
| 2011/0181606 A1 | 7/2011 | Sumner et al. |
| 2011/0182479 A1 | 7/2011 | Sese et al. |
| 2011/0206200 A1 | 8/2011 | Sovio et al. |
| 2011/0234587 A1 | 9/2011 | Maigret et al. |
| 2011/0316854 A1 | 12/2011 | Vandrovec |
| 2012/0095745 A1 | 4/2012 | Le Guevel-Scholtens et al. |
| 2012/0113125 A1 | 5/2012 | Guerrab et al. |
| 2012/0166446 A1 | 6/2012 | Bowman et al. |
| 2012/0280991 A1 | 11/2012 | Maloney et al. |
| 2012/0280995 A1 | 11/2012 | Anderson |
| 2012/0284664 A1 | 11/2012 | Zhao |
| 2013/0090850 A1 | 4/2013 | Mays |
| 2013/0120421 A1 | 5/2013 | Maguire |
| 2013/0120422 A1 | 5/2013 | Rao et al. |
| 2013/0127891 A1 | 5/2013 | Kim et al. |
| 2014/0035908 A1 | 2/2014 | Powell et al. |
| 2014/0059564 A1 | 2/2014 | Vigneras et al. |
| 2014/0108485 A1 | 4/2014 | Geibel et al. |

FOREIGN PATENT DOCUMENTS

| | | |
|---|---|---|
| EP | 2779100 A1 | 9/2014 |
| WO | 2001/063561 A1 | 8/2001 |
| WO | 2007/146800 A2 | 12/2007 |
| WO | 2012/174128 A1 | 12/2012 |

OTHER PUBLICATIONS

"JUNG (Java Universal Network/Graph) Framework Manual, Filtering", available online at <http://jung.sourceforge.net/doc/manual.html#filter>, retrieved on Apr. 30, 2013, 13 pages.

"WebKit Coordinated Graphics System", available online at <http://trac.webkit.org/wiki/CoordinatedGraphicsSystem>, retrieved on Apr. 30, 2013, 9 pages.

Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.

Lu et al., "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.

Oishi et al., "Parallel Alignment of a Large Number of Range Images", Proceedings of the Fourth International Conference on 3-D Digital Imaging and Modeling (3DIM'03), IEEE Computer Society, 2003, 8 pages.

Techfuels, "The Lighting Scene in 3D Animation", available online at <http://www.techfuels.com/applications/9895-lighting-scene-3d-animation.html>, retrieved on Apr. 30, 2013, 3 pages.

Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.

Van Der Beek, Jelle, "Dependency Graphs in Games", Gamasutra The Art & Business of Making Games, available at <http://www.gamasutra.com/viewifeature/131221/dependency_graphs_in_games.php?print=1>, accessed on Apr. 30, 2013, 15 pages.

Extended European Search Report received for European Patent Application No. 14160117.9, mailed on May 26, 2014, 7 pages.

Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.

Schmalstieg et al., "Modeling and Rendering of Outdoor Scenes for Distributed Virtual Environments", ACM VRST '97 Lausanne Switzerland, 1997, pp. 209-215.

Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.

Ex-Parte Quayle Action received for U.S. Appl. No. 13/831,482, mailed on Nov. 24, 2014, 7 pages.

Non Final Office Action received for U.S. Appl. No. 13/843,695, mailed on Oct. 22, 2014, 16 pages.

Non Final Office Action received for U.S. Appl. No. 13/844,424, mailed on Oct. 28, 2014, 10 pages.

Barrett et al., "A Monotonic Superclass Linearization for Dylan", Oopsla 96, Jun. 28, 1996, pp. 69-82.

International Search Report and Written Opinion received for PCT Patent Application No. PCT/US2014/026792, mailed on Aug. 11, 2014, 7 pages.

International Search Report & Written Opinion received for PCT Patent Application No. PCT/US2014/026799, mailed on Sep. 26, 2014, 11 pages.

(56) References Cited

OTHER PUBLICATIONS

Non Final Office Action received for U.S. Appl. No. 13/844,113, mailed on Apr. 10, 2015, 10 pages.
Non-Final Office Action received for U.S. Appl. No. 13/831,482, mailed on Apr. 20, 2015, 8 pages.
Notice of Allowance received for U.S. Appl. No. 13/831,482, mailed on Mar. 4, 2015, 5 pages.
Non-Final Office Action received for U.S. Appl. No. 13/844,497, mailed on Mar. 13, 2015, 21 pages.
Invitation to pay additional fees received for PCT Patent Application No. PCT/US2014/026799, mailed on Jul. 25, 2014, 2 pages.
Final Office Action received for U.S. Appl. No. 13/843,695, mailed on Feb. 23, 2015, 21 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non-Final Office Action received for U.S. Appl. No. 13/844,363, mailed on Feb. 24, 2015, 9 pages.
Rossler et al., "Dynamic Shader Generation for Flexible Multi-Volume Visualization", IEEE Pacific Visualisation Symposium, Mar. 2008, pp. 17-24.
Non-Final Office Action received for U.S. Appl. No. 13/844,380, mailed on Apr. 2, 2015, 9 pages.
Final Office Action received for U.S. Appl. No. 13/844,424, mailed on Apr. 7, 2015, 10 pages.
Wernecke, Josie, "The Inventor Mentor: Programming Object-Oriented 3D Graphics with Open Inventor™, Release 2", Addison-Wesley Publishing Company, Chapter 3. Nodes and Groups, 1994.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
Bederson et al., "Toolkit Design for Interactive Structured Graphics", IEEE Transactions on Software Engineering, vol. 30, No. 8, Aug. 2004, pp. 535-546.
Cheng et al., "High-Extensible Scene Graph Framework Based on Component Techniques", Journal of Zhejiang University Science A, vol. 7, No. 7, 2006, pp. 1247-1252.
Dobos et al. "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.

\* cited by examiner

CONSERVATIVE PARTITIONING FOR RENDERING A COMPUTER-GENERATED ANIMATION

BACKGROUND

1. Field

The present disclosure relates to computer-generated animation and, more specifically, to rendering an image of a computer-generated scene using a dependency graph.

2. Related Art

A computer-generated animation image can be created by rendering one or more computer-generated objects to depict a scene in the image. Light sources, materials, textures, and other visual effects can be associated with the computer-generated objects to create a realistic visual appearance for the animation image. A dependency graph can be used to define the relationships between assets (which represent the computer-generated objects) and a variety of visual effects as part of the rendering process. The dependency graph typically includes one or more interconnected nodes associating the assets with one or more visual effects, where a node wire can pass the assets and visual effects from node-to-node for processing. The output of the dependency graph can be used to create a rendered image of the scene.

In a typical implementation, a dependency graph is used to render a scene using a subset of assets that is less than a complete set of assets associated with the scene. For example, some of the objects associated with the scene may be out of the camera's view for a particular rendered scene and, therefore, do not need to be rendered. Because loading assets into memory takes time and resources, it is generally advantageous to only load the subset of assets that are required to render the scene. However, using traditional techniques, the precise subset of assets that are necessary for rendering is not known until all the asset information has been loaded so that the dependency graph can be evaluated. Traditional techniques may result in the loading of assets (including geometry of the computer-generated objects) that are not used, and as a result, consume more computer resources than necessary. It is therefore desirable to create a system for evaluating dependency graphs with less than a complete set of assets associated with a scene.

SUMMARY

One exemplary embodiment includes a computer-implemented method for partitioning a set of assets. Each asset represents a computer-generated object associated with a computer-generated scene. A dependency graph is accessed. The dependency graph comprises a plurality of interconnected nodes, wherein one of the interconnected nodes includes an organizer node having at least one predicate test. The set of assets identified by an input of the predicate test of the organizer node are accessed. It is determined if the at least one predicate test can be evaluated using the set of assets. If the at least one predicate test can be evaluated, a logical operation is performed on the set of assets to identify one or more partition assets, wherein the one or more partition assets are a subset of the set of assets. The one or more partition assets identified by an output of the organizer node are then passed to a next node in the dependency graph. If the at least one predicate test cannot be evaluated, a conservative set of assets identified by the output of the organizer node is passed to the next node, wherein the conservative set of assets is the same set of assets identified by the input of the predicate test.

In some embodiments, the set of assets includes asset geometry and asset attributes for one or more assets of the set of assets. In some cases, the set of assets does not include asset geometry for one or more assets of the set of assets.

In some cases, the at least one predicate test can be evaluated if a first asset attribute is required for the logical operation and the first asset attribute is able to be accessed at the input to the predicate test. In some cases, the at least one predicate test cannot be evaluated if a first asset attribute is required for the logical operation and the first asset attribute is not able to be accessed at the input to the predicate test. In some cases, the at least one predicate test cannot be evaluated if the asset geometry is required for the logical operation and the asset geometry is able to be accessed at the input to the predicate test. In some cases, the at least one predicate test cannot be evaluated because at least some information for one or more assets of the set of assets is not loaded in computer memory.

In some embodiments, one or more nodes of the plurality of nodes assigns a visual effect to the set of assets. The visual effect may be a virtual light source.

In one exemplary embodiment, the one or more partition assets are passed to a render node of the dependency graph. A rendered image of the computer-generated objects represented by the one or more partition assets is computed using the render node.

One exemplary embodiment includes a computer-implemented method for partitioning a set of assets, wherein each asset represents a computer-generated object associated with a computer-generated scene. A dependency graph is accessed. The dependency graph comprises a plurality of interconnected nodes, including a render node associated with a rendering pass. A render node of the dependency graph is identified, the render node associated with a rendering pass of the computer-generated scene. A set of nodes of the dependency graph that are connected to the render node and are upstream from the render node are identified. A first pass through the dependency graph is performed through the set of nodes to identify a set of partition assets. Asset information is loaded for the set of partition assets. A second pass through the dependency graph through the set of nodes using the asset information for the set of partition assets is performed. A rendered image is computed based on the second pass through the dependency graph.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

A computer-generated animation is typically created by rendering a sequence of images, each image depicting a computer-generated scene composed of one or more computer-generated objects. Light sources, materials, textures, and other visual effects are associated with the computer-generated objects to create a realistic visual appearance for the computer-generated scene.

Figure 1:
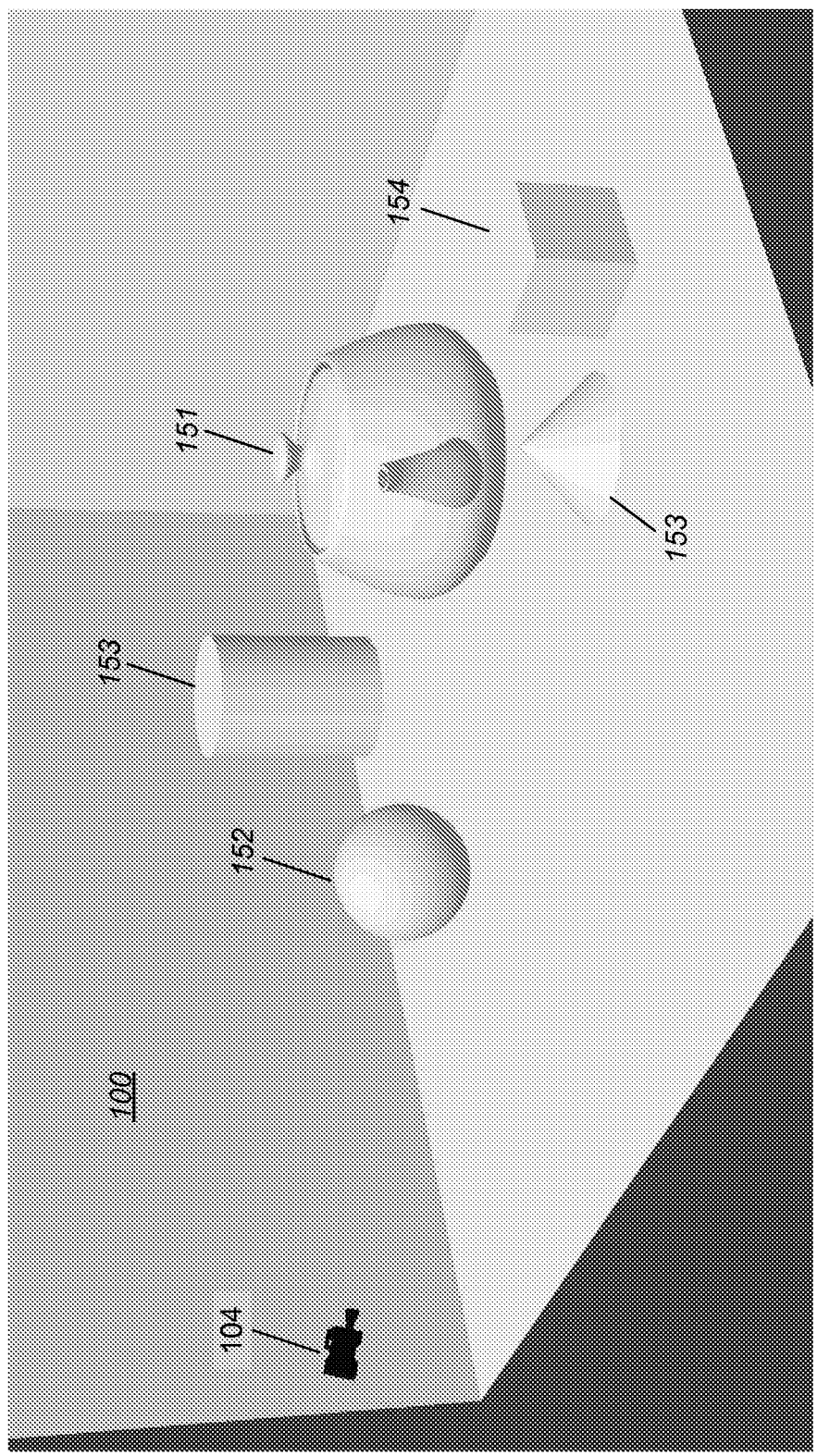
FIG. 1 depicts a set of computer-generated objects associated with a scene.

FIG. 1 depicts an exemplary computer-generated scene having multiple computer-generated objects positioned in a three-dimensional space. For purposes of this discussion, a computer-generated scene generally refers to the three-dimensional space that can be filmed using a virtual camera, and may also be referred to generically as a scene. As shown in FIG. 1, the scene 100 includes surface models of a teapot 151, a sphere 152, a cylinder 153, a cone 153, and a cube 154. In a typical computer animation, the computer-generated objects include one or more computer-animated characters that have been posed or manipulated for purposes of generating a computer-animated film sequence. In this example, the computer-generated objects are surface models defined using surface geometry. In other examples, the computer-generated objects may be defined using solid geometry or defined using other three-dimensional modeling techniques.

As shown in FIG. 1, a virtual camera 104 is positioned to view a portion of the scene 100. Typically, the virtual camera 104 has a field of view that is defined by a camera frustum that projects away from the lens of the virtual camera 104. In general, computer-generated objects that are outside of the camera frustum are not directly seen by the camera. The positions of the virtual camera 104 and computer-generated objects 151-154 in the scene 100 are typically determined by a human operator, such as an animator or director.

Figure 2:
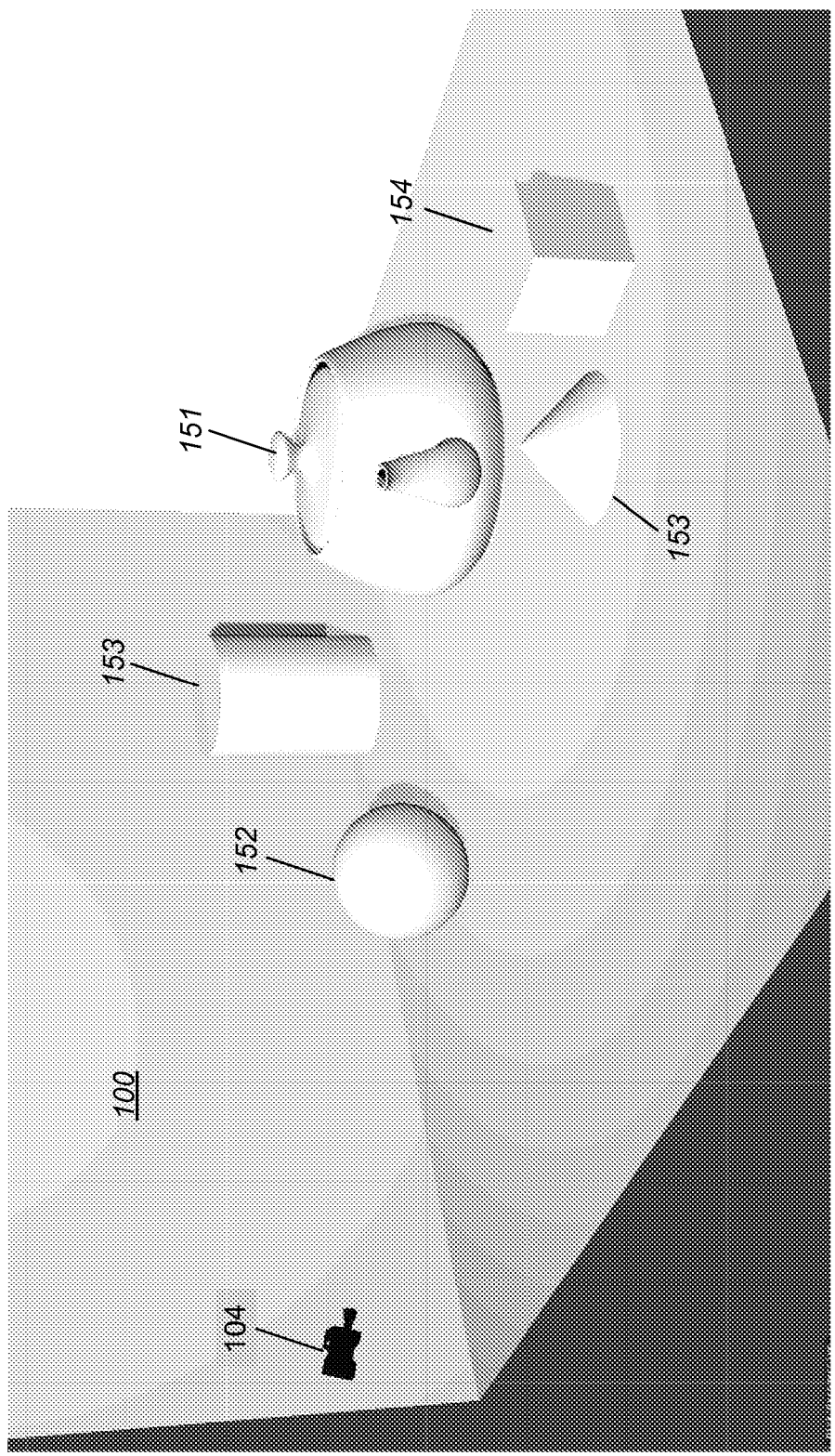
FIG. 2 depicts a set of computer-generated objects associated with a scene with lighting effects applied.

As described in more detail below, lights and other visual effects may also be applied to the scene 100 to give it a more realistic appearance. FIG. 2 depicts the scene 100 with lighting effects applied to the computer-generated objects 151-154. As shown in FIG. 2, the computer-generated objects have been illuminated by a diffuse light source so that the computer-generated objects 151-154 are illuminated from the camera-side. Each computer-generated object 151-154 is shaded in accordance with the diffuse light source and casts a shadow on the floor and walls of the scene 100. The scene 100 is also illuminated by one or more ambient light sources to provide an overall illumination lighting effect to the scene 100. Other light sources that can be used to illuminate the scene 100 include, for example, point lights, spot lights, and area lights.

Figure 3:
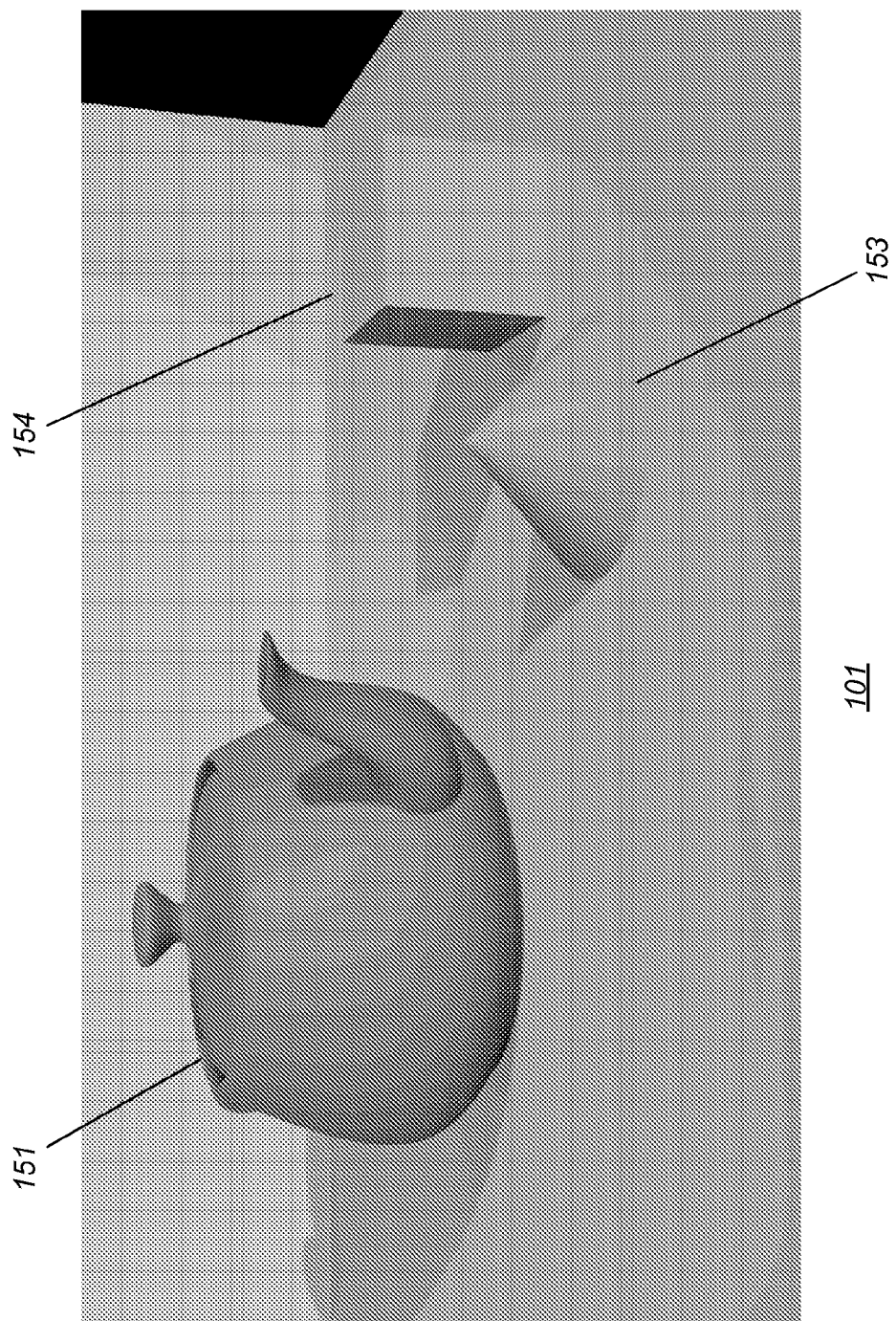
FIG. 3 depicts a rendered image of a scene.

FIG. 3 depicts a rendered image 101 of the portion of the scene 100 in view of the virtual camera 104. As shown in FIG. 3, the image 101 depicts a subset of the computer-generated objects, specifically the teapot 151, cone 153, and cube 154. The computer-generated objects 151, 153, and 154 in FIG. 3 have been rendered using multiple light sources and one or more types of surface shaders for each computer-generated object to produce a realistic-looking image of the scene 100. Surface shaders are used to simulate the optical properties of the surface of the computer-generated objects and define the color, texture, specular properties, and other optical characteristics of the surface of the computer-generated objects. A surface shader may use, for example, a bidirectional reflectance distribution function (BRDF) or other technique for simulating the reflection of light incident on a computer-generated surface. The surface shaders may also be used to define a group of optical properties to simulate a material (e.g., fur, skin, or metal). Typically, the configuration of the light sources, surface shaders, and surface materials are configurable for each computer-generated scene and may be referred to generally as a lighting configuration.

The lighting configuration may be designated on an object-by-object basis or by set of objects identified by a shared asset attribute. For example, a spot-light light source may be associated only with the main characters in the foreground of the scene and may not illuminate other objects. Alternatively, an ambient light might be associated with only the plants in the scene and have no effect on the main characters. This approach simplifies the computations required to render a scene and also provides the animator or user with more flexibility when configuring the visual effects in a scene. However, the additional flexibility can make it difficult to manage a large number of computer-generated objects and their associated visual effects.

Figure 4:
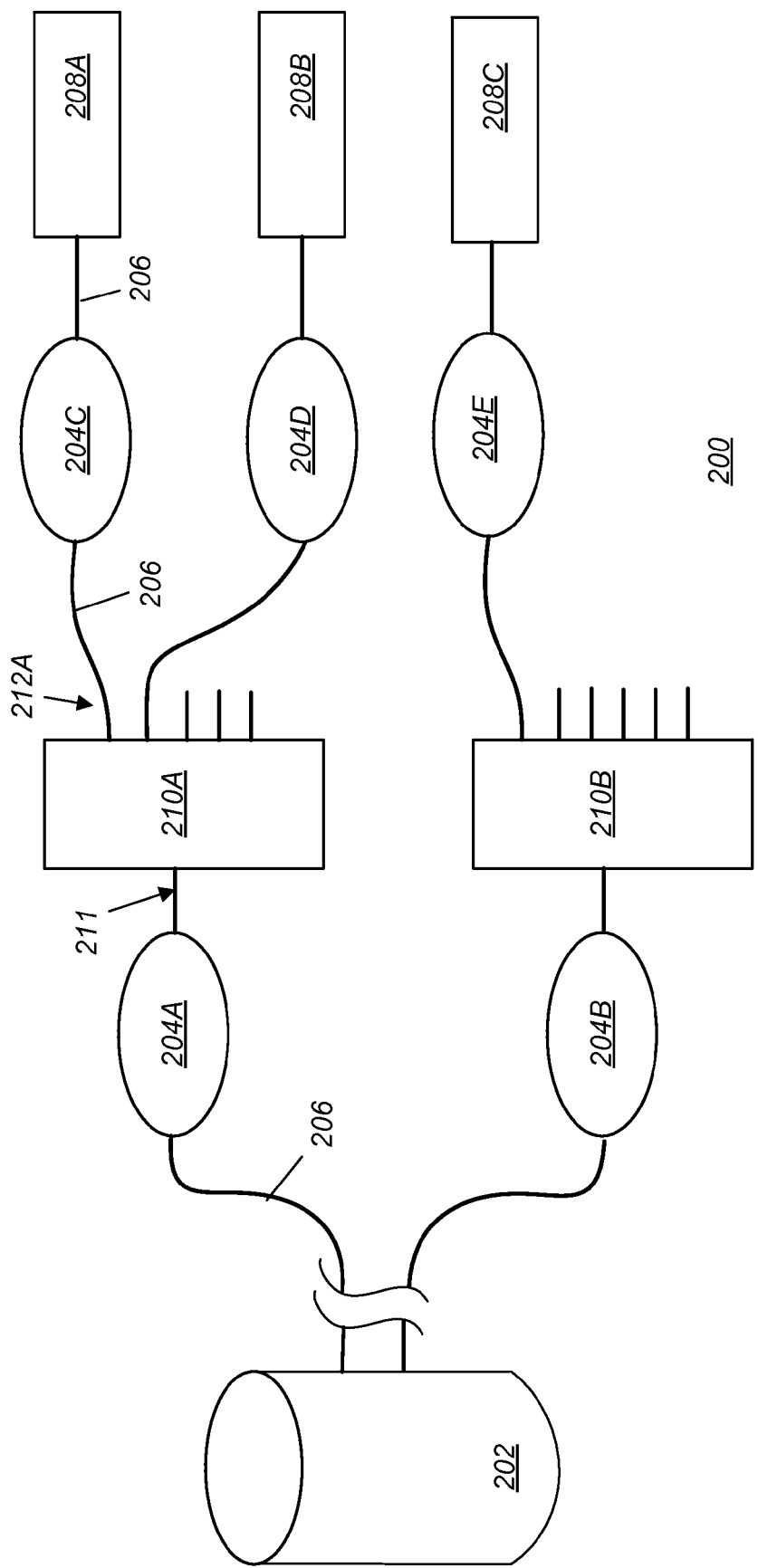
FIG. 4 depicts a schematic representation of a render setup graph.

As previously mentioned, a dependency graph can be used to manage the associations between computer-generated objects and visual effects. For purposes of this discussion, a particular type of dependency graph, called a render setup graph, is used to manage the associations between computer-generated objects and visual effects used to render the scene. FIG. 4 depicts an exemplary visualization of a render setup graph 200. The render setup graph 200 may be displayed on a computer display and manipulated using a graphical user interface and computer I/O hardware, as described in more detail in Section 3, below. The render setup graph 200 is generally configurable by an animator or user and can be used to create multiple lighting scenarios for a scene.

The render setup graph 200 typically accepts as input, a set of computer-generated objects represented by assets located in asset storage 202. The asset storage 202 may be the computer memory of the workstation computer system that is managing the render setup graph 200. The asset storage 202 may also be connected to a remote, centralized computer-storage database that can be accessed by multiple users. A centralized database may improve overall storage efficiency and helps ensure that the computer-generated animation is using a common version of the computer-generated objects.

In the render setup graph 200, visual effects, such as light sources, shaders, and materials are assigned to the assets at various nodes 204A-E. In this example, the render setup graph 200 is evaluated from left to right with each node 204A-E assigning one or more visual effects to a set of assets, each asset representing a computer-generated object in the scene. Node wires 206 are used to pass assets and associated visual effects between elements of the render setup graph 200. Eventually, the assets and their associated visual effects are passed to one of the render nodes 208A-C. In this example, each render node 208A-C contains the completed lighting configuration and can be stored or used to create a rendered image of the scene.

Render setup graph 200 also includes a special type of node called an organizer node (210A-B), which is used to select an asset or subset of assets for downstream node operations. The selection of assets for downstream nodes, also called partitioning, is useful for assigning visual effects based on attributes of the assets. For example, one of the organizer nodes 210A-B may be used to select or identify all of the assets in the scene that are within the view angle or frustum of the camera. The organizer nodes 210A-B may also be used to select or identify assets based on asset name, location, size, or other asset attribute. The subset of assets that are identified by the organizer nodes 210A-B are also referred to herein as a partition or subset of partition assets.

Typically, the organizer nodes 210A-B have multiple outputs, each output representing a subset of partition assets that can be passed to another element in the render setup graph 200. In a typical implementation, the subset of partition assets at an output (e.g., 212A) of one of the organizer node 210A-B is a reduced set of assets as compared to the set of assets received at the input 211 of the organizer node 210A-B. In this way, the assets are culled or reduced in number as they pass through the organizer nodes 210A-B, to the respective downstream nodes 204C-E. Eventually, the subset of partition assets is passed to the render nodes 208A-C and used to compute a rendered image of the scene.

Render setup graphs typically include other elements that provide a variety of functions and operations on the assets as they propagate through the elements. For example, a render setup graph may also include splitter, combiner, and other routing elements. These other elements are omitted from this discussion and the example depicted in FIG. 4 for clarity. The techniques discussed below also apply to render setup graphs having additional elements or fewer elements to those depicted in the render setup graph 200 of FIG. 4.

In general, a render setup graph can be used to define multiple rendering passes for a scene. Each rendering pass may combine a subset of partition assets with a unique set of visual effects. For example, a rendering pass may be configured to render only the assets in the background of the scene. A rendering pass may also be configured to render a subset of partition assets using a simplified set of light sources and shaders to reduce the rendering computations that are necessary to compute the rendered image of the scene.

The render setup graph 200 depicted in FIG. 4 depicts three exemplary rendering passes, as indicated by the presence of three render nodes 208A-C. The lighting configurations for the subsets of partition assets of rendering pass are defined by the respective nodes 204A-C and organizer nodes 210A-B that are connected to each respective render node 208A-C by the node wires 206.

The ability to define and configure rendering passes allows the animator or user to develop different lighting configurations without having to work with the entire set of assets that are associated with a scene. Multiple rendering passes also allow the animator or user to work with a simplified version of the scene that may omit resource-intensive visual effects that are used in the final production rendering pass. In some cases, multiple rendering passes may be combined to produce a final rendered image of the complete scene.

In general, because the assets are selected or partitioned by the organizer nodes 210A-B, any single rendering pass (corresponding to one of the render nodes 208A-C) does not use all of assets that are associated with a scene. Because the assets are typically stored remotely in a centralized computer-storage database, significant computer resources are consumed retrieving and creating local copies of assets. As previously mentioned, by not loading all of the assets for every rendering pass, a savings in computer resources can be realized.

However, the precise set of assets that are necessary for a rendering pass may not be known until the render setup graph 200 is evaluated. In particular, organizer nodes 210A-B may not be able to select or partition the assets for downstream elements if all of the asset information is not loaded and provided as input to the render setup graph 200. However, as described in more detail below, organizer nodes 110A-B can be specially configured to output a partially culled, but conservative set of assets to downstream elements of the render setup graph 200. In some cases, the conservative set of asserts is over-inclusive of the precise set of assets that is required for the rendering pass, but is reduced with respect to the entire set of assets associated with a scene. Accordingly, the system and techniques described can be used to evaluate a rendering pass without loading all of the assets associated the scene being rendered.

1. Evaluating Organizer Nodes Using Incomplete Asset Information

Figure 6:
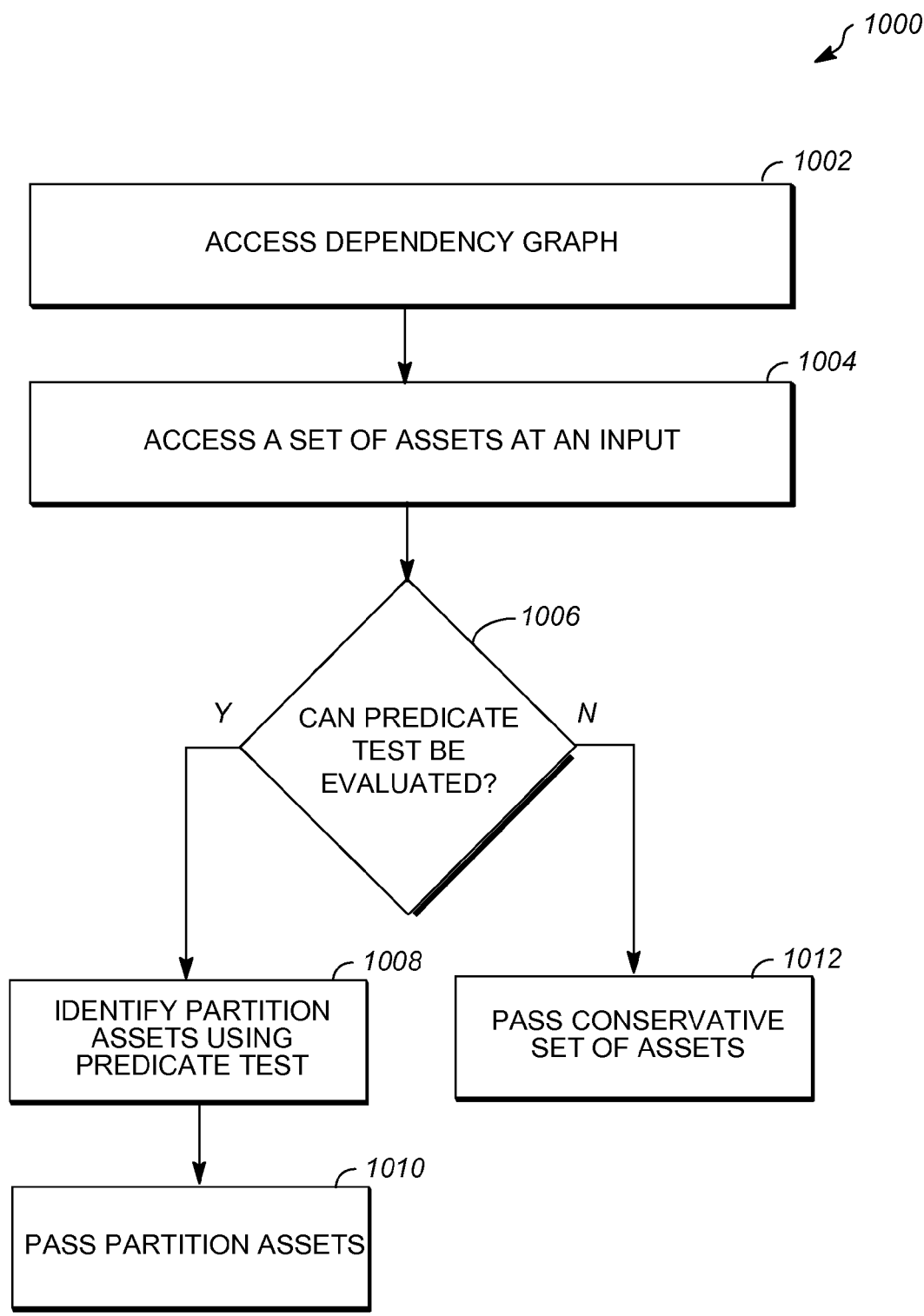
FIG. 6 depicts an exemplary process for evaluating a dependency graph.

FIG. 6 depicts an exemplary process 1000 for evaluating a dependency graph, such as a render setup graph. Process 1000 may be performed using a workstation computer system, as described below with respect to FIG. 8 as part of a computer-animation process. Exemplary process 1000 may be performed, for example, after the computer-generated objects (e.g., animated characters) have been placed or posed in the scene and stored as assets in a centralized storage database. Process 1000 is typically performed before an image of the scene has been rendered.

Process 1000 may provide advantages over other techniques by requiring fewer computing resources, particularly in scenarios where less than all of the asset information has been loaded in the computer memory of the workstation computer. As described above with respect to FIG. 4, the assets used by the render setup graph 200 are stored in asset storage 202, which may retrieve information from a centralized computer-storage database that can be accessed by multiple users over a computer network. Loading assets from the database into workstation memory over the network consumes a nontrivial amount computer resources. Thus, when using a centralized storage configuration, loading fewer assets into workstation memory may reduce network traffic, reduce loads on the centralized database, and may reduce asset loading time.

Process 1000 may be used when computing a rendering pass of a computer-generated scene for an animated film sequence using a dependency graph. For purposes of the following discussion, examples of process 1000 are provided with respect to an organizer node of a render setup graph. Reference is made to FIG. 4 depicting a render setup graph 200 including organizer nodes 210A and 210B. A more detailed depiction of the organizer node 210A is provided in FIG. 5.

In operation 1002, a dependency graph is accessed. FIG. 4 depicts one type of dependency graph, namely a render setup graph 200. As discussed above, the render setup graph 200 includes a plurality of nodes 204A-E, 210A-B, and 208A-C that are interconnected using node wires 206. The nodes 204A-E may associate one or more visual effects (e.g., lighting or materials) with a set of assets representing computer-generated objects in the scene. The assets and associated visual effects are passed between the interconnected nodes via the node wires 206. As shown in FIG. 4, one or more of the nodes may be an organizer node 210A-B for partitioning the assets into one or more subset asset partitions.

As described above with respect to FIG. 4, organizer nodes 210A-B are used to select or partition the set of assets in to smaller sets that are used as input to downstream elements of the render setup graphs. Using one or more organizer nodes, a render setup graph can be configured to define multiple rendering passes, each rendering pass represented by a respective render node 208A-C.

Figure 5:
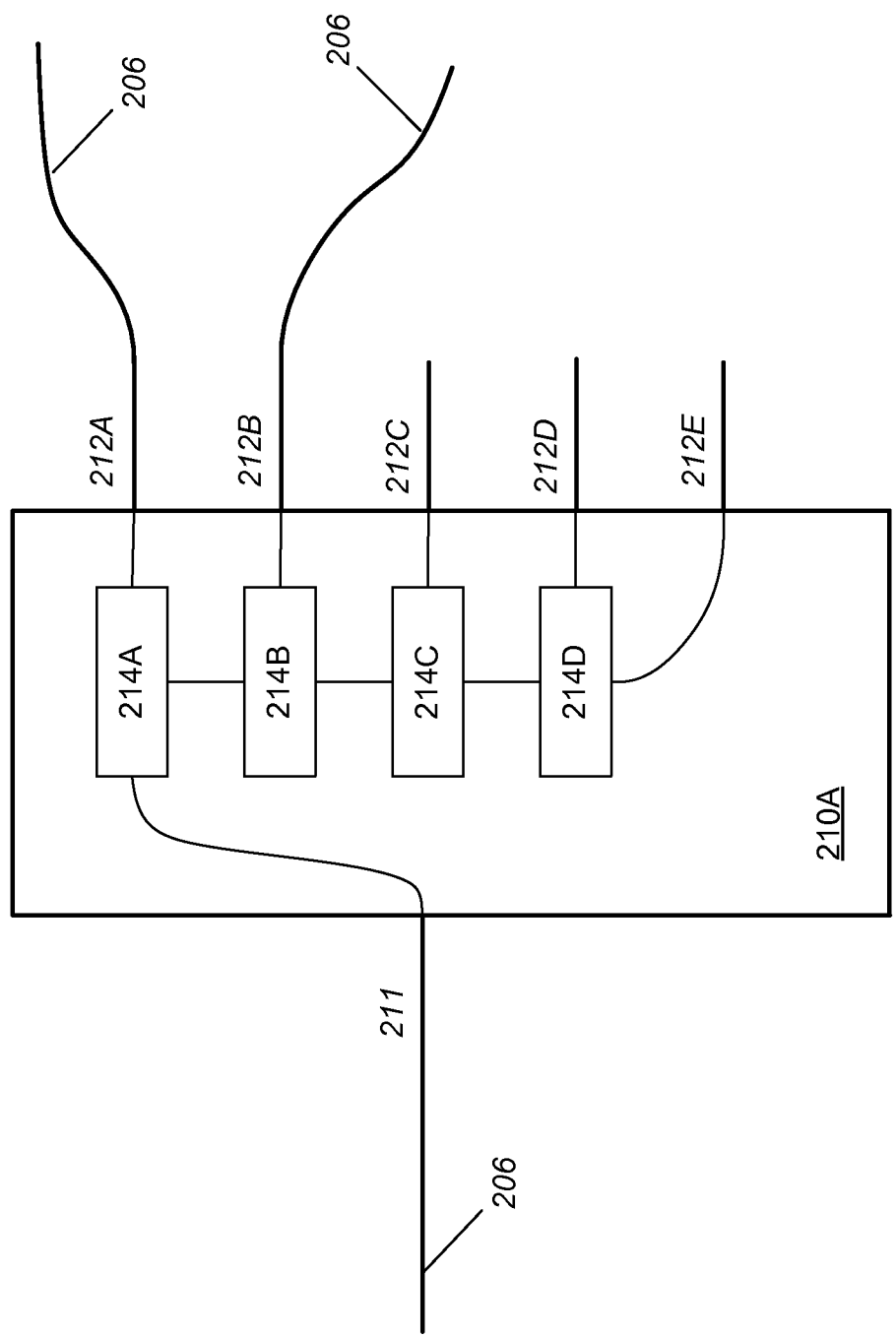
FIG. 5 depicts a schematic representation of an organizer node of a render setup graph.

FIG. 5 depicts a schematic representation of the organizer node 210A. In a typical implementation, a set of assets is identified by the input 211 of the organizer node 210A. The set of assets may be passed to the input 211 by one or more upstream nodes at input 211. The organizer node 210A partitions the input set of assets into multiple subsets of partition assets by evaluating one or more predicate tests 214A-D. Each predicate test 214A-D may include one or more logical operations that can be used to identify or select a subset of partition assets. The subset of partition assets may then be provided on a respective output 212A-D of the organizer node 210A as a partition and connected to a downstream element using a node wire 206.

One exemplary predicate test may include a logical operation for identifying assets having asset geometry that satisfies a geometry-based logical operation. For example, this exemplary predicate test may identify assets that have curved surface geometry. With reference to the computer-generated objects associated with scene 100 depicted in FIGS. 2 and 3, this predicate test may be used to identify assets that represent the sphere 152, cylinder 153, and cone 153, which each have curved surface geometry.

In a typical implementation, the assets that do not satisfy a preceding predicate test (e.g., 214A) serve as the input to a subsequent predicate test (e.g., 214B). Typically, each predicate test receives those assets that do not satisfy any preceding predicate tests, and performs a new logical operation on those assets. If an organizer node 210A is configured in this way, the set of assets at the input 211 may be partitioned into five unique and non-overlapping subsets of assets on corresponding outputs 212A-E.

To ensure that every predicate test of every organizer node can be evaluated, all of the asset information associated with a scene can be loaded and used as input to the render setup graph. Evaluating the render setup graph using a complete set asset information (including asset geometry) may result in a perfect culling of the assets for each rendering node. However, this approach also requires that all of the asset information be loaded into memory, which, as discussed above, consumes a nontrivial amount of computer resources.

However, using process 1000, the organizer nodes of the render setup graph can be configured to relax the condition that every subset of assets at an output be unique and non-overlapping. As a result, the organizer nodes can be used to produce a partially culled but potentially over-inclusive (conservative) set of assets can be identified using the render setup graph without having all of the asset information loaded into memory.

In operation 1004, an input set of assets is accessed at an input of the organizer node. With reference to the organizer node 210A in FIG. 5, an input set of assets at input 211 may be accessed. In this example, the input set of assets is passed to the organizer node 210A from and upstream node via one or more node wires 206. Typically, the input set of assets does not include complete asset information for every asset associated with a scene. For example, the input set of assets may not include geometry information for at least some of the assets associated with the scene. In some cases, the input set of assets includes complete information for at least some, but not all of the assets associated with the scene. The information that is received in operation 1004 typically depends on the asset information that has been previously loaded into workstation memory.

In many cases, at least some information about all of the assets associated with a scene is available for access by the organizer node 210A in operation 1004. For example, one or more asset attributes for all of the assets associated with a scene may be received by the organizer node 210A. That is, even if all of the assets associated with a scene are not loaded in workstation memory, at least some of the attributes of every asset associated with a scene may be loaded into workstation memory before operation 1004 is performed.

In general, loading asset attributes consumes significantly less resources than loading the entire asset, which typically includes surface geometry of the computer-generated object. For example, asset attributes, including asset name, location, and bounding box, are typically loaded for every asset associated with a scene. An asset name is typically a unique character string that identifies the asset, a location is typically three-dimensional coordinate value of the geometric center of the computer-generated object within the scene, and a bounding box is typically a cuboid that defines the volumetric envelope occupied by the computer-generated object in the scene. These asset attributes are typically loaded into local memory because they require a comparatively small amount of computing resources to load and store.

In operation 1006, it is determined if a predicate test can be evaluated using the input set of assets. As described above with respect to FIG. 5, a predicate test 214A-D typically includes one or more logical operations that can be used to identify a subset of partition assets by performing a logical operation. Operation 1006 may be performed for each predicate test 214A-D of the organizer node 210A.

Operation 1006 may be performed by examining the information that is required to perform the logical operation of the predicate test. If the information that is required to perform the logical operation is provided as asset information in operation 1004, the predicate test can typically be evaluated. If the information that is required to perform the logical operation has not been provided as input, or has not been loaded into workstation memory, the predicate test typically cannot be evaluated.

In a first example, a first exemplary predicate test may be configured to identify assets that have geometry with a curved surface. This first exemplary predicate test can be evaluated if, for example, the geometry of the set of assets is provided as input in operation 1004. However, if the geometry of the set of assets is not provided as input, because, for example, the geometry has not been loaded into the workstation memory, this first exemplary predicate test cannot be evaluated.

In a second example, a second exemplary predicate test may be configured to identify assets that are within the frustum of the camera. This second exemplary predicate test can be evaluated if the location of each of the assets within the scene is provided as input in operation 1004. The location of the assets can be determined if, for example, the location and bounding box asset attributes for the set of assets received at operation 1004 are known. As discussed above, location and bounding box asset attributes are typically loaded and stored for every asset associated with the scene and are likely to be accessed in operation 1004. If this is the case, and the location and bounding box information is available for access, this second exemplary predicate test can be evaluated.

In operation 1008, if the predicate test can be evaluated using the input set of assets, a subset of partition assets is identified using the first predicate test. In other words, if there is enough information about the assets to evaluate the predicate test, then identify those assets that satisfy the predicate test. This operation is in accordance with the normal operation of the predicate tests 214A-D of the organizer node 210A, as discussed above with respect to FIG. 5.

With reference again to the first example provided above, a first exemplary predicate test may be configured to identify assets that have geometry with a curved surface. In this case, the first exemplary predicate test may evaluate the curvature of the asset geometry of each asset of the set of assets. A geometric-based logical operation that tests for geometry having a non-zero curvature can be used to identify the relevant partition assets. With reference to FIG. 1, this first exemplary predicate test may be used to identify those assets that represent the sphere 152, cylinder 153, cone 153, and teapot 151, which all include geometry having a curved surface.

With reference to the second example provided above, a second exemplary predicate test may be configured to identify assets that are within the frustum of the camera. In this case, the second exemplary predicate test may be evaluated by determining the geometry of the camera frustum identifying assets having a location and bounding box that intersect the frustum geometry. With reference to FIGS. 1-3, this second exemplary predicate test may be used to identify assets that represent the teapot 151, cone 153, and cube 154, which have locations and bounding boxes that intersect the frustum of the virtual camera 104. See, for example, FIG. 3 depicting a rendered image 101 of the scene which shows these objects in view of the camera 104.

In operation 1010, the subset of partition assets is passed to the next node in the render setup graph. With reference to FIGS. 4 and 5, the assets identified by, for example, partition test 214A is passed to the next downstream node 204C via node wire 206. Visual effects that have already been associated with the set of partition assets by, for example, upstream node 204A, are also passed to the next node in the render setup graph. Because the subset of partition assets are a subset of the input set of assets, the assets have been at least partially culled for downstream node operations.

As discussed above with respect to FIG. 5 the assets that do not satisfy the predicate test are passed to either the next predicate test in the organizer node or an output of the organizer node. With reference to FIG. 5, assets that do not satisfy predicate test 214A are passed to the next predicate test 214B. In the case that the predicate test is the last test in the series (e.g., predicate test 214D), then the assets that do not satisfy the predicate test are passed to an output (e.g., output 212E) of the organizer node. As shown in FIG. 5, the last output 212E may not be connected to a downstream node by a node wire. In general, any output of an organizer node may or may not be connected (via a node wire) to a downstream node.

In operation 1012, if the predicate test cannot be evaluated using the input set of assets, a conservative set of assets is passed to the next node in the render setup graph. To avoid dropping an asset that may be necessary for the rendering pass, the conservative set of assets is the same as the input set of assets. In other words, if there is not enough information about the assets to evaluate the predicate test, then the predicate test is skipped and the set of assets received at the input are reproduced on the respective output of the organizer node as a conservative set of assets and passed to the next node in the render setup graph.

With reference again to the first example provided above, a first exemplary predicate test may be configured to identify assets that have geometry with a curved surface. In this case, the first exemplary predicate test may not be evaluated if, for example, the asset geometry is not included in the set of assets received in operation 1004. As a result, the entire set of assets that is received at input in operation 1004 is passed to the next node in the render setup graph as a conservative set of assets.

With reference to FIG. 5, if predicate test 214A cannot be evaluated, the assets that are received at input 211 are provided as a conservative set of assets to an output 212A that corresponds to predicate test 214A. Furthermore, the conservative set of assets (the entire set of assets received by the predicate test 214A) is also passed down to the next predicate test in the series, 214B. In the case of the last predicate test 214D, conservative set of assets (the entire set of assets received by the preceding predicate test 214C) is passed to the output 212E.

Process 1000 is typically performed for every predicate test in an organizer node. In general, when evaluation of a predicate test is possible, a set of partition assets are identified and passed on through the render setup graph. When evaluation of a predicate test is not possible, the partition test is skipped and the set of assets that are received as an input are passed on through the render setup graph. This process may also be repeated for every organizer node wired to the render node associated with the render pass that is being computed.

Typically, performing process 1000 for an entire pass of the render setup graph results in a partially-culled, but potentially over-inclusive set of assets at the render node. That is, that the set of assets is at least partially culled by one or more partitions in the graph that can be evaluated. The set of asset may also be over-inclusive or conservative due to one or more partitions that cannot be evaluated. Thus, using process 1000, the number of assets may be reduced without eliminating assets that may be necessary for the rendering pass.

2. Evaluating a Dependency to Render an Image

Figure 7:
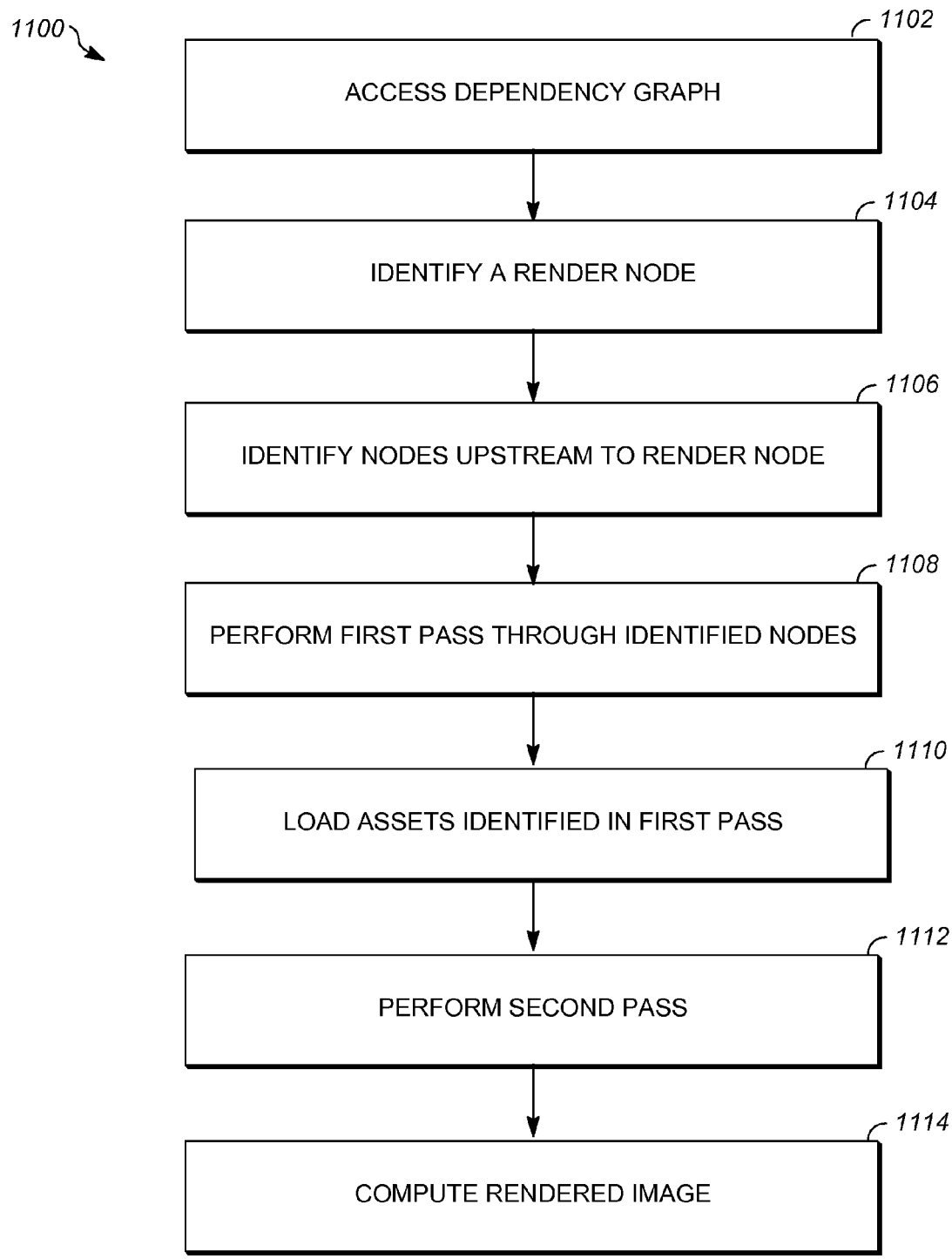
FIG. 7 depicts an exemplary process for rendering an image using a dependency graph.

Process 1000 can be used within a broader process to render an image of a scene comprising one or more computer-generated objects. FIG. 7 depicts an exemplary process 1100 for computing a rendered image by performing multiple passes through a dependency graph. More specifically, a first pass of the dependency graph is performed to identify a potentially over-inclusive set of assets necessary for the rendered image. A second pass of the dependency graph is then performed after retrieving some or all of the asset information for assets identified by the first pass. Additional passes can be performed to further refine the set of assets, and then used to retrieve some or all of the asset information for the refined set of assets. Eventually, a rendered image can be calculated based on the last pass of the dependency graph.

Process 1100, described below, describes a two-pass iteration for refining a set of assets for a rendering pass. However, in other implementations, more than two passes can be performed, with some, but not necessarily all, asset information loaded after each pass through the dependency graph. Performing multiple-passes to refine the set of assets, such as described in process 1100, in conjunction with process 1000, described above, may result in a computational savings by reducing the amount of asset information retrieved from a centralized database.

In operation 1102, a dependency graph is accessed. As described above with respect to FIG. 4, an exemplary dependency graph is render setup graph 200 including a plurality of nodes 204A-E, 210A-B, and 208A-C that are interconnected using node wires 206. Operation 1102 is similar to operation 1002 discussed above with respect to FIG. 6.

In operation 1104, a render node is identified. With reference to FIG. 4, one of the render nodes 208A, 208B, or 208C within the render setup graph 200 is identified. The render node may be identified by, for example, selecting a particular render pass of the render setup graph. As discussed above, each render node 208A-C may represent a different render pass, in which a lighting condition is applied to a specific set of assets (representing computer-generated object in the scene).

In operation 1006, the nodes that are upstream to the render node are identified. With reference to FIG. 4, multiple nodes 204A, 210A, 204C are upstream of the render node 208A. The upstream nodes define the lighting effects and assets that will be implemented in the render pass. The upstream nodes may be identified by, for example, tracing the node wires from the render node back to the input of the dependency graph.

In operation 1108, a first pass of the dependency graph is performed through the identified nodes. In this operation, an input set of assets is provided as input to the series of nodes identified in operation 1106. As described above, the input set of assets typically does not include all of the asset information for the set of assets. For example, memory-intensive aspects, such as the asset geometry, may not be loaded and provided as input to the dependency graph to conserve computing resources. As also discussed above with respect to operation 1004 of process 1000, there are typically at least some asset attributes that are loaded for all of the assets associated with the scene. The asset attributes that are loaded on the workstation computer are typically provided as input to the first pass of the dependency graph.

When performing operation 1108, process 1000 may be implemented for each predicate test that is encountered in the organizer nodes of the render setup graph. As discussed above in the preceding section, implementing process 1000 throughout the predicate test in a dependency graph may result in the identification of a partially culled, but potentially over-inclusive set of assets.

In operation 1110, some or all of the asset information for the assets that were identified in the first pass are loaded into memory. In one example, the set of assets identified in operation 1008 is used to download all of the asset information associated for those assets from the centralized database storage. As previously mentioned, less than all of the asset information can also be loaded and multiple passes of the dependency graph be performed to refine the set of assets for the render pass.

Because the assets identified in the first pass (operation 1108) are over-inclusive, the set of assets can be used to identify all of the asset information that may be necessary for performing the selected render pass. Additionally, because the set of assets may also be partially culled, retrieving the asset information for the identified assets typically results in a computational savings as compared to the download of all of the asset information associated with a scene.

In operation 1112, a second pass of the dependency graph is performed. In this operation, the dependency graph is evaluated using the asset information obtained in operation 1110. The set of assets obtained in operation 1110 is potentially over-inclusive. Therefore, if all of the asset information is obtained for the assets identified in the first pass, the dependency graph, each of the predicate tests in the render pass can be evaluated and a perfectly culled set of assets can be obtained.

As previously mentioned, less than all of the asset information may retrieved for a second pass. If the dependency graph can be fully evaluated on the second pass, then no further passes are necessary. However, if the predicate tests cannot be fully evaluated in the second pass, additional asset information may be retrieved and the dependency graph reevaluated. This process can be repeated as often as necessary to obtain a perfectly culled set of assets.

In operation 1114, a rendered image is computed. After the second (or subsequent) pass of the dependency graph is performed, a perfectly culled set of assets and the associated visual effects are provided to the respective render node. This information can then be passed to a rendering process to compute a rendered image. Computing a rendered image may include performing one or more processes on the assets using the selected visual effect(s) based on the dependency graph. The external processes may include any process, such as rendering, shading, rasterizing, or the like that the animator, lighter, or other user may want to perform on the objects used by the dependency graph. An exemplary rendered image is depicted in FIG. 3.

3. Workstation Computer System

Figure 8:
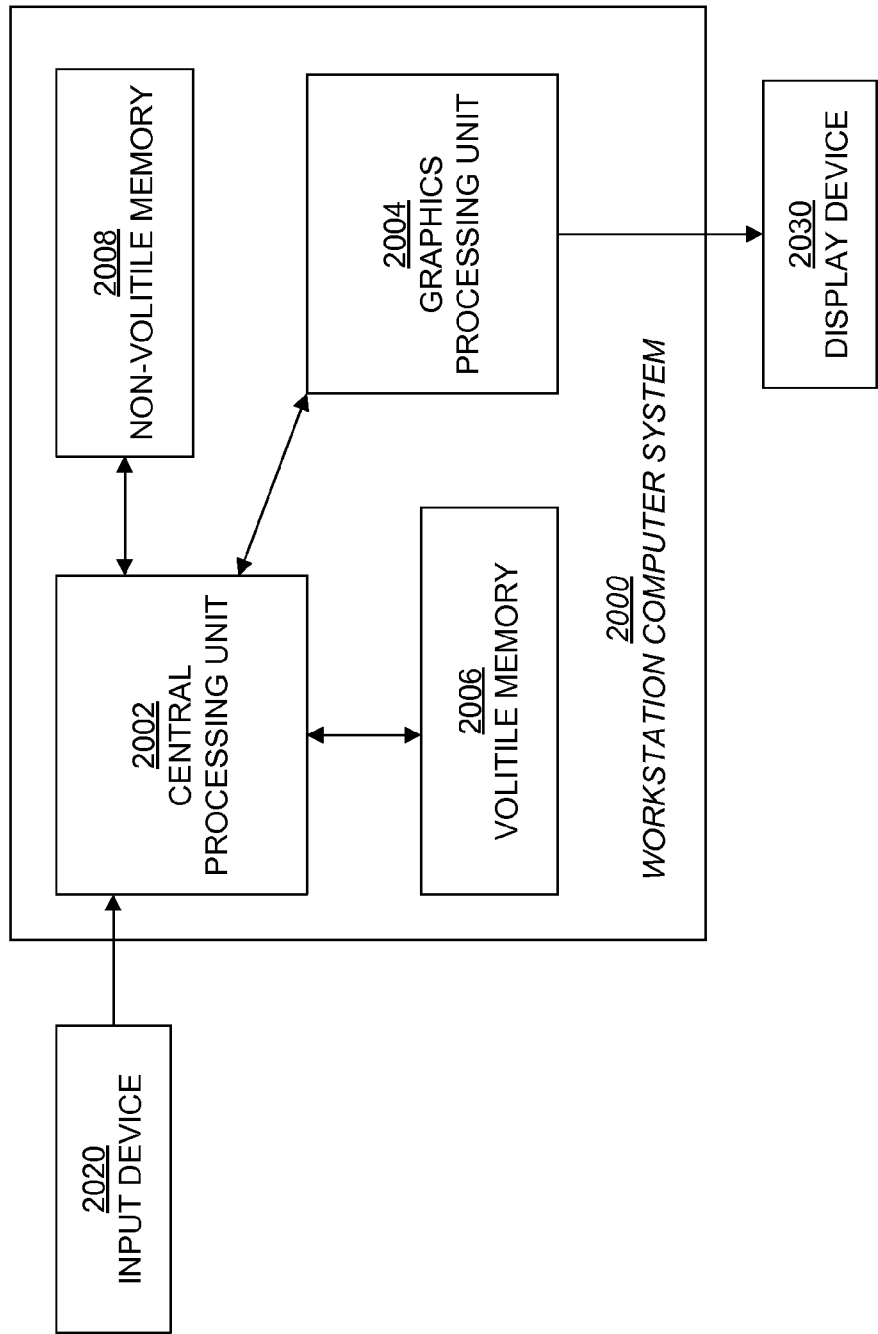
FIG. 8 depicts an exemplary workstation computer system.

FIG. 8 depicts an exemplary workstation computer system 2000 that can be used to implement the render setup graph and techniques discussed above. The render setup graph can be implemented, for example, in either hardware or in software stored on a non-transitory computer-readable storage medium. The system can be configured to generate, modify, and evaluate the render setup graph to configure and manage lighting configuration data as well as external processes used to render a computer-generated image. The system can be further configured to receive input from a user and to display graphics, an image, or scene of an animation based on the render setup graph.

The workstation computer system 2000 can be configured to receive user input from an input device 2020. The input device 2020 can be any device that receives input from the user and transmits it to the workstation computer system 2000. For example, the input device 2020 can be a keyboard, a mouse, a tablet, a stylus, or the like. Those skilled in the art will recognize that other types of input devices can also be used.

The workstation computer system 2000 can be configured to output graphics, images, or animation to a display device 2030. The display device 2030 can include any device that receives data from the workstation computer system and presents the data to the user. For example, the display device 2030 may include a liquid crystal display, a set of light-emitting diodes, a projector, or the like. Those skilled in the art will recognize that other types of output devices can also be used.

The workstation computer system 2000 may further include a central processing unit 2002. The central processing unit may include one or more processing cores. The central processing unit 2002 may be coupled to and able to communicate with the input device 2020. Although the workstation computer system 2000 is illustrated with one central processing unit 2002, the workstation computer system 2000 may include multiple processing units. The workstation computer system 2000 may also include a graphics processing unit 2004. The graphics processing unit 2004 may be dedicated to processing graphics-related data. The graphics processing unit 2004 may include a single processing core or multiple processing cores. Although the workstation computer system 2000 is illustrated with one graphics processing unit 2004, the workstation computer system 2000 may include a plurality of graphics processing units. The central processing unit 2002 and/or the graphics processing unit 2004 may be coupled to and able to communicate data to the output device 2030.

In one example, the workstation computer system 2000 may include one or more processors and instructions stored in a non-transitory computer-readable storage medium, such as a memory or storage device, that when executed by the one or more processors, perform animation rendering using a render setup graph, as described above. In the context of the embodiments described herein, a "non-transitory computer-readable storage medium" can contain or store a program for use by or in connection with the instruction execution system, apparatus, or device. Examples of non-transitory computer readable storage medium include, but is not limited to, an electronic, magnetic, optical, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CDRW, DVD, DVD-R, or DVD-RW, or flash memory such as compact flash cards, secured digital cards, USB memory devices, and memory sticks.

The workstation computer system 2000 may include volatile memory 2006, which is a non-transitory computer-readable storage medium, in communication with the central processing unit 2002. The volatile memory 2006 may include, for example, random access memory, such as dynamic random access memory or static random access memory, or any other type of volatile memory. The volatile memory 2006 may be used to store data or instructions during the operation of the workstation computer system 2000. Those skilled in the art will recognize that other types of volatile memory can also be used.

The workstation computer system 2000 may also include non-volatile memory 2008, which is a non-transitory computer-readable storage medium, in communication with the central processing unit 2002. The non-volatile memory 2008 may include flash memory, hard disks, magnetic storage devices, read-only memory, or the like. The non-volatile memory 2008 may be used to store animation data, render setup graph data, computer instructions, or any other information. Those skilled in the art will recognize that other types of non-volatile memory can also be used.

The workstation computer system 2000 is not limited to the devices, configurations, and functionalities described above. For example, although a single volatile memory 2006, non-volatile memory 2008, central processing unit 2002, graphics processing unit 2004, input device 2020, and output device 2030 are illustrated, a plurality of any of these devices can be implemented internal or external to the workstation computer system 2000. In addition, the workstation computer system 2000 may include a network access device for accessing information on a network, such as an internal network or the Internet. Those skilled in the art will recognize that other configurations of the workstation computer system 2000 can be used.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for partitioning a set of assets, wherein each asset represents a computer-generated object associated with a computer-generated scene, the method comprising:

accessing, by one or more processors, a dependency graph, the dependency graph comprising a plurality of interconnected nodes, wherein one of the interconnected nodes includes an organizer node having at least one predicate test;

accessing, by one or more processors, the set of assets identified by an input of the predicate test of the organizer node;

determining, by one or more processors, if the at least one predicate test can be evaluated using the set of assets;

if the at least one predicate test can be evaluated,
performing, by one or more processors, a logical operation on the set of assets to identify one or more partition assets, wherein the one or more partition assets are a subset of the set of assets, and
passing, by one or more processors, the one or more partition assets at an output of the organizer node to a next node in the dependency graph; and if the at least one predicate test cannot be evaluated,
passing, by one or more processors, a conservative set of assets at the output of the organizer node to the next node, wherein the conservative set of assets is the same set of assets identified by the input of the predicate test.

2. The computer-implemented method of claim 1, wherein the set of assets includes asset geometry and asset attributes for one or more assets of the set of assets.

3. The computer-implemented method of claim 1, wherein the set of assets does not include asset geometry for one or more assets of the set of assets.

4. The computer-implemented method of claim 1, wherein the at least one predicate test can be evaluated if a first asset attribute is required for the logical operation and the first asset attribute is able to be accessed at the input to the predicate test.

5. The computer-implemented method of claim 1, wherein the at least one predicate test cannot be evaluated if a first asset attribute is required for the logical operation and the first asset attribute is not able to be accessed at the input to the predicate test.

6. The computer-implemented method of claim 1, wherein the at least one predicate test cannot be evaluated if the asset geometry is required for the logical operation and the asset geometry is able to be accessed at the input to the predicate test.

7. The computer-implemented method of claim 1, wherein the at least one predicate test cannot be evaluated because at least some information for one or more assets of the set of assets is not loaded in computer memory.

8. The computer-implemented method of claim 1, wherein one or more nodes of the plurality of nodes assigns a visual effect to the set of assets.

9. The computer-implemented method of claim 1, wherein the visual effect is a virtual light source.

10. The computer-implemented method of claim 1, further comprising:
passing, by one or more processors, the one or more partition assets to a render node of the dependency graph; and
computing, by one or more processors, a rendered image of the computer-generated objects represented by the one or more partition assets using the render node.

11. A computer-implemented method for partitioning a set of assets, wherein each asset represents a computer-generated object associated with a computer-generated scene, the method comprising:

accessing, by one or more processors, a dependency graph, the dependency graph comprising a plurality of interconnected nodes, including a render node associated with a rendering pass;

identifying, by one or more processors, a render node of the dependency graph, the render node associated with a rendering pass of the computer-generated scene;

identifying, by one or more processors, a set of nodes of the dependency graph that are connected to the render node and are upstream from the render node;

performing, by one or more processors, a first pass through the dependency graph through the set of nodes to identify a set of partition assets;

loading, by one or more processors, asset information for the set of partition assets;

performing, by one or more processors, a second pass through the dependency graph through the set of nodes using the asset information for the set of partition assets; and computing, by one or more processors, a rendered image based on the second pass through the dependency graph.

12. The computer-implemented method of claim 11, wherein performing a first pass through the dependency graph comprises:

accessing, by one or more processors, the dependency graph, wherein one of the interconnected nodes includes an organizer node having at least one predicate test;

accessing, by one or more processors, the set of assets identified by an input of the predicate test of the organizer node;

determining, by one or more processors, if the at least one predicate test can be evaluated using the set of assets;

if the at least one predicate test can be evaluated,
performing, by one or more processors, a logical operation on the set of assets to identify one or more partition assets, wherein the one or more partition assets are a subset of the set of assets, and
passing, by one or more processors, the one or more partition assets at an output of the organizer node to a next node in the dependency graph; and if the at least one predicate test cannot be evaluated,
passing, by one or more processors, a conservative set of assets at the output of the organizer node to the next node, wherein the conservative set of assets is the same set of assets identified by the input of the predicate test.

13. A non-transitory computer-readable storage medium comprising computer-executable instructions for partitioning a set of assets, wherein each asset represents a computer-generated object associated with a computer-generated scene, the computer-executable instructions comprising instructions for:

accessing a dependency graph, the dependency graph comprising a plurality of interconnected nodes, wherein one of the interconnected nodes includes an organizer node having at least one predicate test;

accessing the set of assets identified by an input of the predicate test of the organizer node;

determining if the at least one predicate test can be evaluated using the set of assets;

if the at least one predicate test can be evaluated,
performing a logical operation on the set of assets to identify one or more partition assets, wherein the one or more partition assets are a subset of the set of assets, and passing the one or more partition assets at an output of the organizer node to a next node in the dependency graph; and if the at least one predicate test cannot be evaluated,
passing a conservative set of assets at the output of the organizer node to the next node, wherein the conservative set of assets is the same set of assets identified by the input of the predicate test.

14. The computer-readable storage medium of claim 13, wherein the set of assets includes asset geometry and asset attributes for one or more assets of the set of assets.

15. The computer-readable storage medium of claim 13, wherein the set of assets does not include asset geometry for one or more assets of the set of assets.

16. The computer-readable storage medium of claim 13, further comprising instructions for:

passing the one or more partition assets to a render node of the dependency graph; and computing a rendered image of the computer-generated objects represented by the one or more partition assets using the render node.

17. A non-transitory computer-readable storage medium comprising computer-executable instructions for partitioning a set of assets, wherein each asset represents a computer-generated object associated with a computer-generated scene, the computer-executable instructions comprising instructions for:

accessing a dependency graph, the dependency graph comprising a plurality of interconnected nodes, including a render node associated with a rendering pass;

identifying a render node of the dependency graph, the render node associated with a rendering pass of the computer-generated scene;

identifying a set of nodes of the dependency graph that are connected to the render node and are upstream from the render node;

performing a first pass through the dependency graph through the set of nodes to identify a set of partition assets;

loading asset information for the set of partition assets;

performing a second pass through the dependency graph through the set of nodes using the asset information for the set of partition assets; and computing a rendered image based on the second pass through the dependency graph.

18. An apparatus for performing graphics processing, the apparatus comprising:

a memory configured to store data; and a computer processor configured to:

access a dependency graph, the dependency graph comprising a plurality of interconnected nodes, wherein one of the interconnected nodes includes an organizer node having at least one predicate test;

access the set of assets identified by an input of the predicate test of the organizer node;

determine if the at least one predicate test can be evaluated using the set of assets;

if the at least one predicate test can be evaluated,
perform a logical operation on the set of assets to identify one or more partition assets, wherein the one or more partition assets are a subset of the set of assets, and pass the one or more partition assets at an output of the organizer node to a next node in the dependency graph; and if the at least one predicate test cannot be evaluated, pass a conservative set of assets at the output of the organizer node to the next node, wherein the conservative set of assets is the same set of assets identified by the input of the predicate test.

19. The apparatus of claim 18, wherein the computer processor is further configured to:
   pass the one or more partition assets to a render node of the dependency graph; and
   compute a rendered image of the computer-generated objects represented by the one or more partition assets using the render node.

20. An apparatus for performing graphics processing, the apparatus comprising:
   a memory configured to store data; and
   a computer processor configured to:
      access a dependency graph, the dependency graph comprising a plurality of interconnected nodes, including a render node associated with a rendering pass;
      identify a render node of the dependency graph, the render node associated with a rendering pass of the computer-generated scene;
      identify a set of nodes of the dependency graph that are connected to the render node and are upstream from the render node;
      perform a first pass through the dependency graph through the set of nodes to identify a set of partition assets;
      load asset information for the set of partition assets;
      perform a second pass through the dependency graph through the set of nodes using the asset information for the set of partition assets; and
      compute a rendered image based on the second pass through the dependency graph.

* * * * *